(12) United States Patent
Fukunaga

(10) Patent No.: US 10,933,947 B2
(45) Date of Patent: Mar. 2, 2021

(54) BICYCLE SPROCKET

(71) Applicant: SHIMANO INC., Sakai (JP)

(72) Inventor: Yasufumi Fukunaga, Sakai (JP)

(73) Assignee: SHIMANO INC., Sakai (JP)

( * ) Notice: Subject to any disclaimer, the term of this patent is extended or adjusted under 35 U.S.C. 154(b) by 271 days.

(21) Appl. No.: 15/705,471

(22) Filed: Sep. 15, 2017

(65) Prior Publication Data

US 2019/0084648 A1  Mar. 21, 2019

(51) Int. Cl.
*B62M 9/12* (2006.01)
*F16H 55/30* (2006.01)

(52) U.S. Cl.
CPC ............... *B62M 9/12* (2013.01); *F16H 55/30* (2013.01)

(58) Field of Classification Search
CPC .......... B62M 9/10; B62M 9/105; B62M 9/12; F16H 55/30
See application file for complete search history.

(56) References Cited

U.S. PATENT DOCUMENTS

| | | | | |
|---|---|---|---|---|
| 5,085,620 A | * | 2/1992 | Nagano | B62M 9/105 474/152 |
| 5,545,096 A | * | 8/1996 | Su | B62M 9/10 474/160 |
| 5,935,033 A | * | 8/1999 | Tseng | B62M 9/105 474/116 |
| 6,139,456 A | * | 10/2000 | Lii | B62M 9/10 474/152 |
| 2011/0092327 A1 | * | 4/2011 | Oishi | B62M 9/10 474/160 |
| 2017/0370458 A1 | * | 12/2017 | Kamada | B62M 9/124 |
| 2018/0202531 A1 | * | 7/2018 | Ooishi | F16H 55/30 |

* cited by examiner

*Primary Examiner* — Michael R Mansen
*Assistant Examiner* — Robert T Reese
(74) *Attorney, Agent, or Firm* — Mori & Ward LLP

(57) ABSTRACT

A bicycle sprocket comprises a sprocket body and a plurality of sprocket teeth including at least one first tooth to initially disengage with the bicycle chain in a shifting operation where the bicycle chain shifts from the bicycle sprocket to an adjacent smaller bicycle sprocket. At least one second tooth is disposed adjacent to the at least one first tooth at an upstream side of the at least one first tooth in a driving rotational direction of the bicycle sprocket. The at least one second tooth has a first tooth height. At least one third tooth is disposed adjacent to the at least one second tooth at the upstream side of the at least one second tooth. The at least one third tooth has a second tooth height longer than the first tooth height.

11 Claims, 14 Drawing Sheets

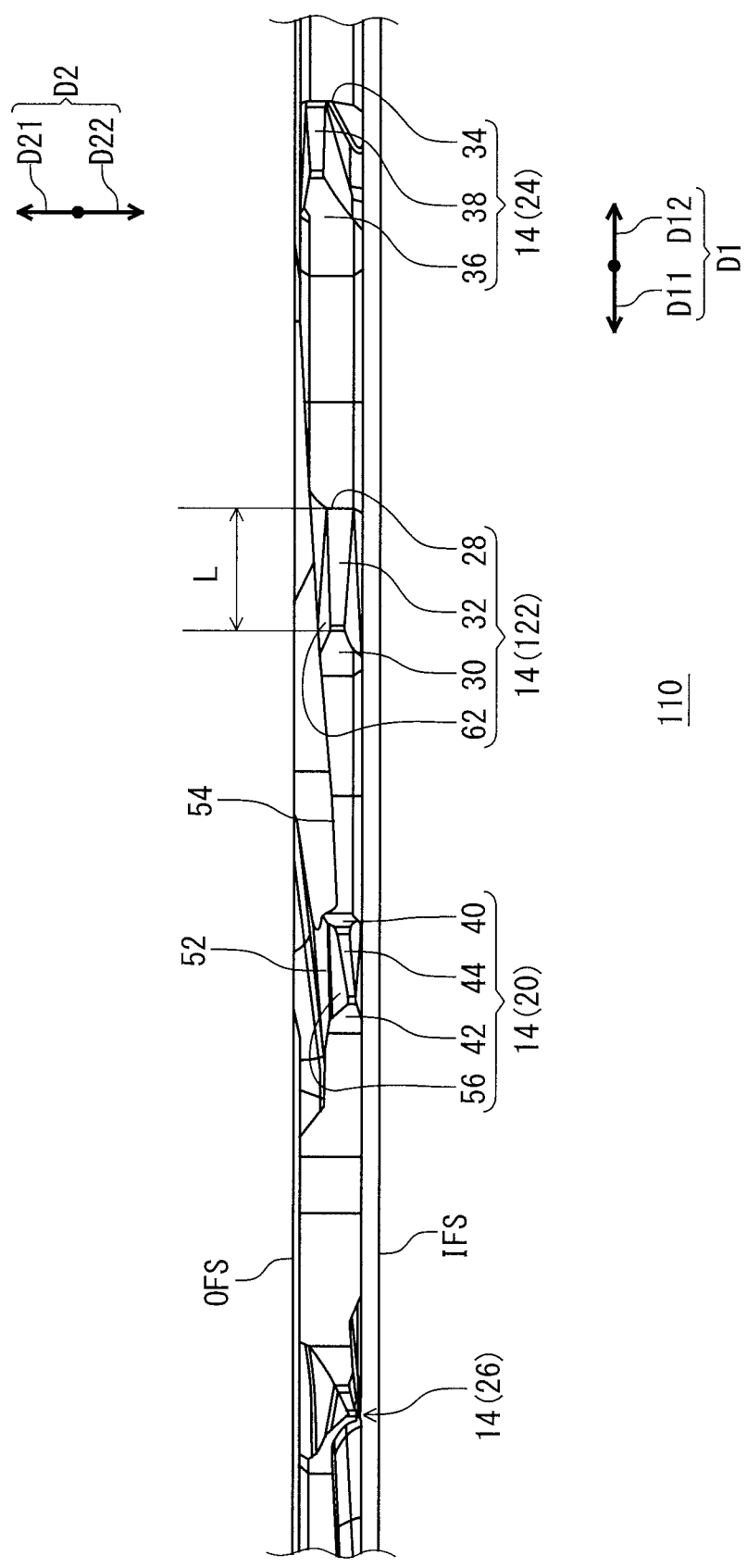

BICYCLE SPROCKET

BACKGROUND OF THE INVENTION

Field of the Invention

The present invention relates to a bicycle sprocket.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle sprocket.

SUMMARY OF THE INVENTION

In accordance with a first aspect of the present invention, a bicycle sprocket comprises a sprocket body and a plurality of sprocket teeth. The plurality of sprocket teeth are provided on an outer periphery of the sprocket body. The plurality of sprocket teeth includes at least one first tooth, at least one second tooth, and at least one third tooth. The at least one first tooth is to initially disengage with the bicycle chain in a shifting operation where the bicycle chain shifts from the bicycle sprocket to an adjacent smaller bicycle sprocket. The at least one second tooth is disposed adjacent to the at least one first tooth without any tooth between the at least one first tooth and the at least one second tooth in a circumferential direction with respect to a rotational center axis of the bicycle sprocket at an upstream side of the at least one first tooth in a driving rotational direction of the bicycle sprocket. The at least one second tooth has a first tooth height. The at least one third tooth is disposed adjacent to the at least one second tooth without any tooth between the at least one second tooth and the at least one third tooth in the circumferential direction at the upstream side of the at least one second tooth. The at least one third tooth has a second tooth height longer than the first tooth height.

With the bicycle sprocket according to the first aspect, it is possible to reduce the possibility that the at least one second tooth interferes outward shifting movement of the bicycle chain when the at least one first tooth disengages with the bicycle chain. Therefore, it is possible to facilitate outward shifting operation.

In accordance with a second aspect of the present invention, the bicycle sprocket according to the first aspect is configured so that the first tooth height is shorter than the second tooth height by at least 1.0 mm.

With the bicycle sprocket according to the second aspect, it is possible to further reduce the possibility that the at least one second tooth interferes outward shifting movement of the bicycle chain when the at least one first tooth disengages with the bicycle chain. Therefore, it is possible to further facilitate outward shifting operation.

In accordance with a third aspect of the present invention, the bicycle sprocket according to second aspect is configured so that the first tooth height is shorter than the second tooth height by 1.1 mm to 1.6 mm.

With the bicycle sprocket according to the third aspect, it is possible to further reduce the possibility that the at least one second tooth interferes outward shifting movement of the bicycle chain when the at least one first tooth disengages with the bicycle chain. Therefore, it is possible to further facilitate outward shifting operation.

In accordance with a fourth aspect of the present invention, the bicycle sprocket according to any one of the first to third aspects is configured so that the plurality of sprocket teeth further include at least one additional tooth to initially disengage with the bicycle chain in the shifting operation where the bicycle chain shifts from the bicycle sprocket to the adjacent smaller bicycle sprocket. The at least one additional tooth is disposed adjacent to the at least one first tooth without any tooth between the at least one first tooth and the at least one additional tooth in the circumferential direction at a downstream side of the at least one first tooth in the driving rotational direction.

With the bicycle sprocket according to the fourth aspect, it is possible to facilitate outward shifting operation even in a case where a total number of teeth of the bicycle sprocket is an odd number.

In accordance with a fifth aspect of the present invention, the bicycle sprocket according to any one of the first to fourth aspects is configured so that the at least one second tooth has a driving surface, a non-driving surface opposite to the driving surface in the circumferential direction, and a tooth tip connecting the driving surface and the non-driving surface. The tooth tip has a length shorter than or equal to 1.5 mm in the circumferential direction.

With the bicycle sprocket according to the fifth aspect, it is possible to further reduce the possibility that the at least one second tooth interferes outward shifting movement of the bicycle chain when the at least one first tooth disengages with the bicycle chain. Therefore, it is possible to further facilitate outward shifting operation.

In accordance with a sixth aspect of the present invention, a bicycle sprocket comprises a sprocket body and a plurality of sprocket teeth. The plurality of sprocket teeth are provided on an outer periphery of the sprocket body. The plurality of sprocket teeth includes at least one first tooth and at least one second tooth. The at least one first tooth is configured to initially disengage with the bicycle chain in a shifting operation where the bicycle chain shifts from the bicycle sprocket to an adjacent smaller bicycle sprocket. The at least one second tooth is disposed adjacent to the at least one first tooth without any tooth between the at least one first tooth and the at least one second tooth in a circumferential direction with respect to a rotational center axis of the bicycle sprocket at an upstream side of the at least one first tooth in a driving rotational direction of the bicycle sprocket. The at least one second tooth has a driving surface and a non-driving surface opposite to the driving surface in the circumferential direction. The at least one second tooth has a first tooth edge height at the driving surface and a second tooth edge height at the non-driving surface. The first tooth edge height is longer than the second tooth edge height by at least 0.5 mm.

With the bicycle sprocket according to the sixth aspect, it is possible to reduce the possibility that the at least one second tooth interferes outward shifting movement of the bicycle chain when the at least one first tooth disengages with the bicycle chain. Therefore, it is possible to facilitate outward shifting operation.

In accordance with a seventh aspect of the present invention, the bicycle sprocket according to the sixth aspect is configured so that the at least one second tooth has a tooth tip connecting the driving surface and the non-driving surface. The tooth tip has a length shorter than or equal to 1.5 mm in the circumferential direction.

With the bicycle sprocket according to the seventh aspect, it is possible to further reduce the possibility that the at least one second tooth interferes outward shifting movement of the bicycle chain when the at least one first tooth disengages with the bicycle chain. Therefore, it is possible to further facilitate outward shifting operation.

In accordance with an eighth aspect of the present invention, the bicycle sprocket according to the sixth or seventh aspect is configured so that the at least one first tooth has an additional driving surface facing the non-driving surface in the circumferential direction. The at least one first tooth has a third tooth edge height at the additional driving surface which is longer than the first tooth edge height.

With the bicycle sprocket according to the eighth aspect, it is possible to further reduce the possibility that the at least one second tooth interferes outward shifting movement of the bicycle chain when the at least one first tooth disengages with the bicycle chain. Therefore, it is possible to further facilitate outward shifting operation.

In accordance with a ninth aspect of the present invention, the bicycle sprocket according to any one of the sixth to eighth aspects is configured so that the plurality of sprocket teeth further include at least one additional tooth to initially disengage with the bicycle chain in the shifting operation where the bicycle chain shifts from the bicycle sprocket to the adjacent smaller bicycle sprocket. The at least one additional tooth is disposed adjacent to the at least one first tooth without any tooth between the at least one first tooth and the at least one additional tooth in the circumferential direction at a downstream side of the at least one first tooth in the driving rotational direction.

With the bicycle sprocket according to the ninth aspect, it is possible to facilitate outward shifting operation even in a case where a total number of teeth of the bicycle sprocket is an odd number.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 14 is a partial plan view of the bicycle sprocket illustrated in FIG. 12.

DESCRIPTION OF THE EMBODIMENTS

Figure 1:
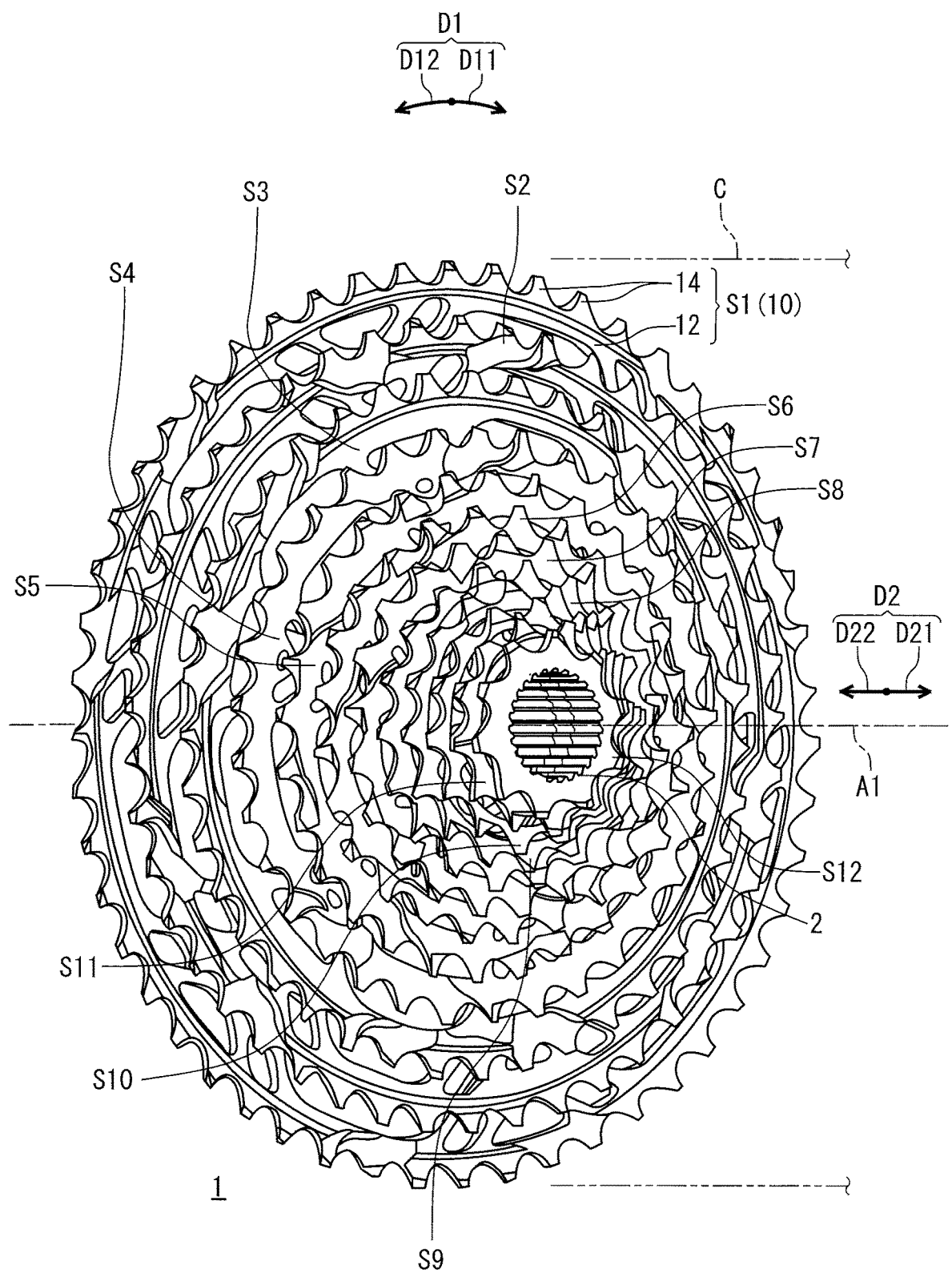
FIG. 1 is a perspective view of a bicycle multiple sprocket assembly including a bicycle sprocket in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle multiple sprocket assembly 1 including a bicycle sprocket 10 in accordance with a first embodiment is illustrated. The bicycle multiple sprocket assembly 1 is configured to engage with a bicycle chain C. In this embodiment, the bicycle multiple sprocket assembly 1 comprises twelve bicycle sprockets S1 to S12, The bicycle multiple sprocket assembly 1 has a rotational center axis A1. The bicycle multiple sprocket assembly 1 is rotatable about the rotational center axis A1 in a driving rotational direction D11 during the pedaling. The driving rotational direction D11 is defined along a circumferential direction D1 of the bicycle multiple sprocket assembly 1 with respect to the rotational center axis A1.

Figure 2:
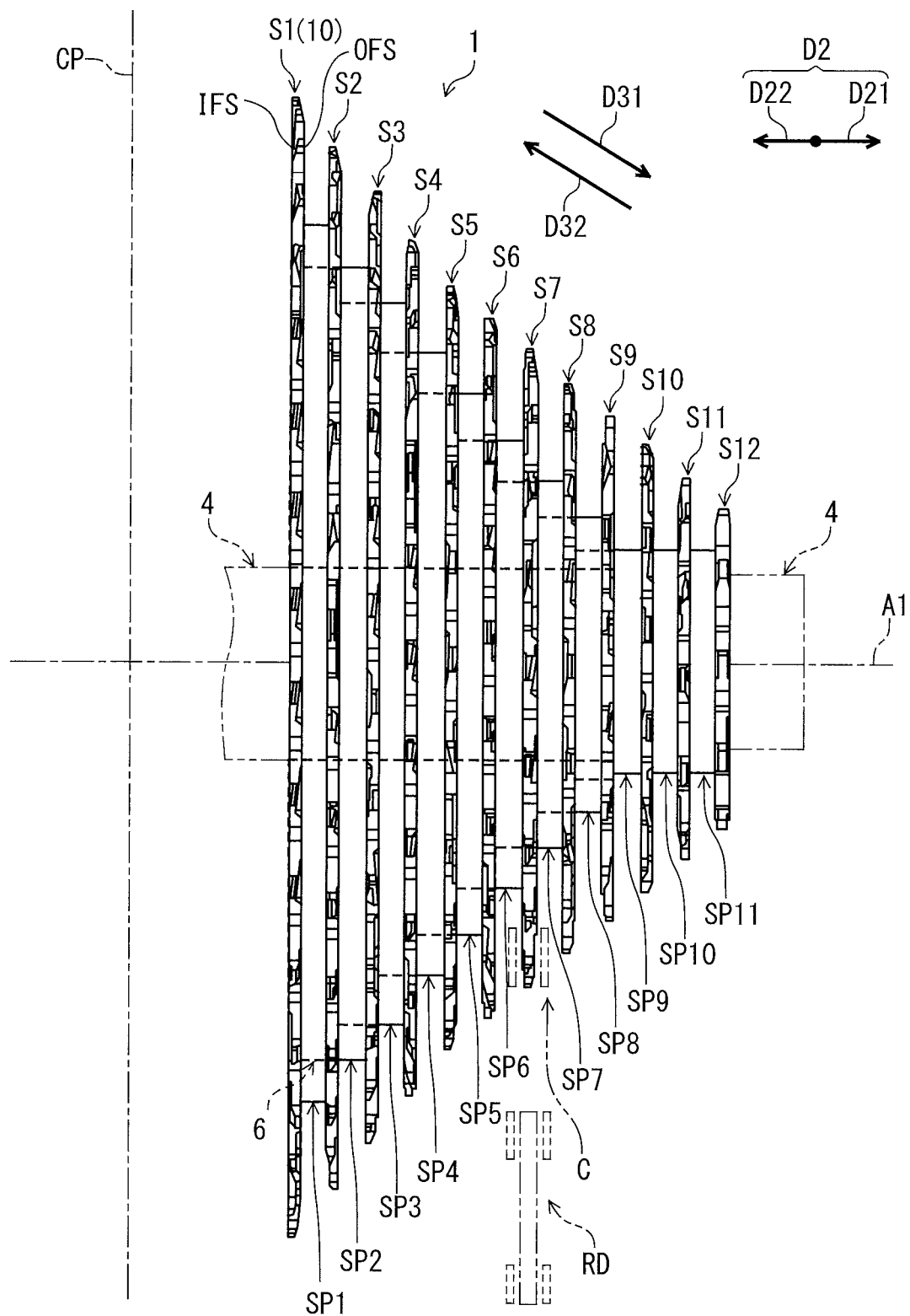
FIG. 2 is a front elevational view of the bicycle multiple sprocket assembly.

As seen in FIG. 1, the bicycle multiple sprocket assembly 1 further comprises a hub engagement structure 2 configured to engage with a bicycle hub assembly 4 (See FIG. 2). While the bicycle multiple sprocket assembly 1 is a bicycle rear sprocket assembly in the illustrated embodiment, structures of the bicycle multiple sprocket assembly 1 can be applied to a front sprocket assembly if needed and/or desired, Each of the bicycle sprockets S1 to S12 is a bicycle rear sprocket in this embodiment, and the structures of the bicycle sprockets S1 to S12 can be applied to a bicycle front sprocket.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on the saddle (not shown) of a bicycle with facing a handlebar (not shown). Accordingly, these terms, as utilized to describe the bicycle multiple sprocket assembly 1, should be interpreted relative to a bicycle (not shown) equipped with the bicycle multiple sprocket assembly 1 as used in an upright riding position on a horizontal surface.

As seen in FIG. 2, the bicycle sprockets S1 to S12 are arranged in an axial direction D2 parallel to the rotational center axis A1. The bicycle sprockets S1 to S12 are spaced apart from each other in the axial direction D2. The bicycle multiple sprocket assembly 1 includes spacers SP1 to SP11. Each of the spacers SP1 to SP11 is arranged between adjacent two sprockets of the bicycle sprockets S1 to S12. Inside such spacers, a sprocket support 6 to which a plurality of bicycle sprockets are mounted is used. However, the sprocket support 6 can be omitted. In such case, all sprockets S1 to S12 can be configured to directly engage with the bicycle hub assembly 4.

The bicycle sprocket S1 has an outer diameter which is largest in the bicycle sprockets S1 to S12. The bicycle sprocket S12 has an outer diameter which is smallest in the bicycle sprockets S1 to S12. The bicycle sprocket S1 is closer to a bicycle center plane CP of a bicycle frame (not shown) than the bicycle sprocket S12 in a state where the bicycle multiple sprocket assembly 1 is mounted to the bicycle hub assembly 4. For example, outward shifting occurs when the bicycle chain C is shifted by a rear derailleur RD from a larger sprocket to a neighboring smaller sprocket in an outward shifting direction D31. Inward shifting occurs when the bicycle chain C is shifted by the rear derailleur RD from a smaller sprocket to a neighboring larger sprocket in an inward shifting direction D32. In the present application, outward shifting operation and inward shifting operation can be collectively referred to as shifting operation.

The bicycle sprocket S1 will be described as a bicycle sprocket 10 in detail below. The bicycle sprockets S2 to S12 can have substantially the same structure as that of the bicycle sprocket 10. Thus, they will not be described in detail here for the sake of brevity.

As seen in FIG. 2, the bicycle sprocket 10 includes an outward facing side OFS and an inward facing side IFS. The outward facing side OFS faces in the axial direction D2 parallel to the rotational center axis A1. The inward facing side IFS faces in the axial direction D2. The inward facing side IFS is opposite to the outward facing side OFS in the axial direction D2. More specifically, the outward facing side OFS faces in an outward direction D21. The inward facing side IFS faces in an inward direction D22. The inward direction D22 is directed toward the bicycle center plane CP. The outward direction D21 is a reverse direction of the inward direction D22. The axial direction D2 is a bidirectional direction including the outward direction D21 and the inward direction D22.

Figure 3:
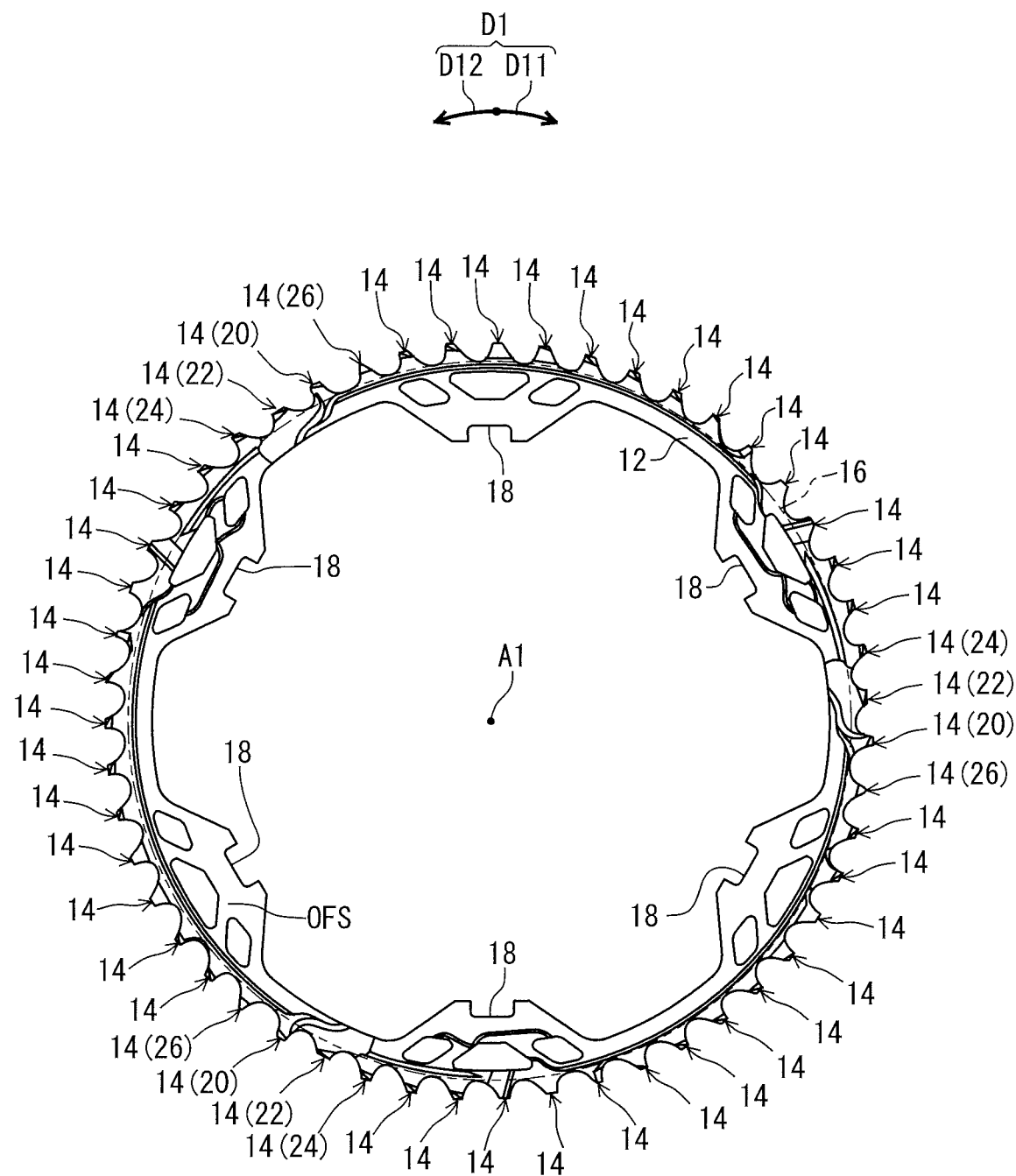
FIG. 3 is a side elevational view of the bicycle sprocket of the bicycle multiple sprocket assembly illustrated in FIG. 1.
Figure 4:
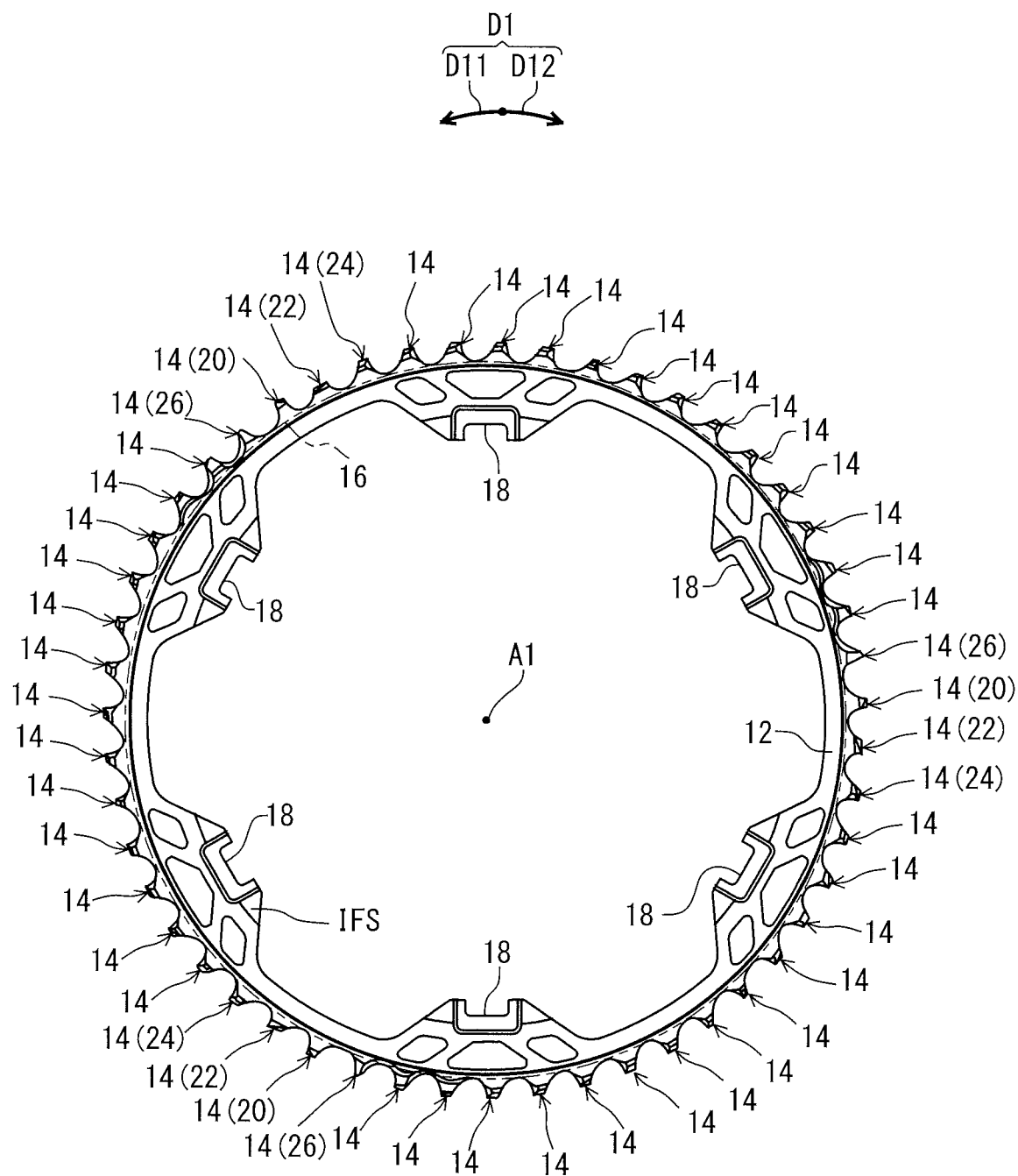
FIG. 4 is another side elevational view of the bicycle sprocket of the bicycle multiple sprocket assembly illustrated in FIG. 1.

FIG. 3 illustrates the outward facing side OFS of the bicycle sprocket 10. FIG. 4 illustrates the inward facing side IFS of the bicycle sprocket 10. As seen in FIGS. 3 and 4, the bicycle sprocket 10 comprises a sprocket body 12 and a plurality of sprocket teeth 14. The sprocket body 12 includes an outer periphery 16 provided about a rotational center axis A1 of the bicycle sprocket 10. The outer periphery 16 is a root circle of the bicycle sprocket 10. The plurality of sprocket teeth 14 are provided on the outer periphery 16 of the sprocket body 12. The plurality of sprocket teeth 14 are configured to engage with the bicycle chain C. The sprocket body 12 is configured to be rotatable about the rotational center axis A1. The plurality of sprocket teeth 14 extend radially outwardly from the outer periphery 16 of the sprocket body 12. The bicycle sprocket 10 can further include an attachment portion 18 to which the sprocket support 6 is attached. The bicycle sprocket 10 can be mounted to the bicycle hub assembly 4 via the sprocket support 6. However, the bicycle sprocket 10 can include the hub engagement structure 2 in place of the attachment portion 18 to directly engage with the bicycle hub assembly 4.

As seen in FIGS. 3 and 4, the plurality of sprocket teeth 14 includes at least one first tooth 20 and at least one second tooth 22. The at least one first tooth 20 is to initially disengage with the bicycle chain C in a shifting operation where the bicycle chain C shifts from the bicycle sprocket 10 to an adjacent smaller bicycle sprocket. In a case where the bicycle sprocket 10 is the bicycle sprocket S1, the adjacent smaller bicycle sprocket is the bicycle sprocket S2. The at least one second tooth 22 is disposed adjacent to the at least one first tooth 20 without any tooth between the at least one first tooth 20 and the at least one second tooth 22 in the circumferential direction D1 with respect to the rotational center axis A1 of the bicycle sprocket 10 at an upstream side of the at least one first tooth 20 in the driving rotational direction D11 of the bicycle sprocket 10. The plurality of sprocket teeth 14 includes at least one third tooth 24 disposed adjacent to the at least one second tooth 22 without any tooth between the at least one second tooth 22 and the at least one third tooth 24 in the circumferential direction D1 at the upstream side of the at least one second tooth 22. In the illustrated embodiment, the plurality of sprocket teeth 14 further include at least one additional tooth 26 to initially disengage with the bicycle chain C in the shifting operation where the bicycle chain C shifts from the bicycle sprocket 10 to the adjacent smaller bicycle sprocket. The at least one additional tooth 26 is disposed adjacent to the at least one first tooth 20 without any tooth between the at least one first tooth 20 and the at least one additional tooth 26 in the circumferential direction D1 at a downstream side of the at least one first tooth 20 in the driving rotational direction D11. However, the at least one additional tooth 26 can be omitted or the at least one additional tooth 26 can have substantially the same feature as that of the at least one third tooth 24.

Figure 5:
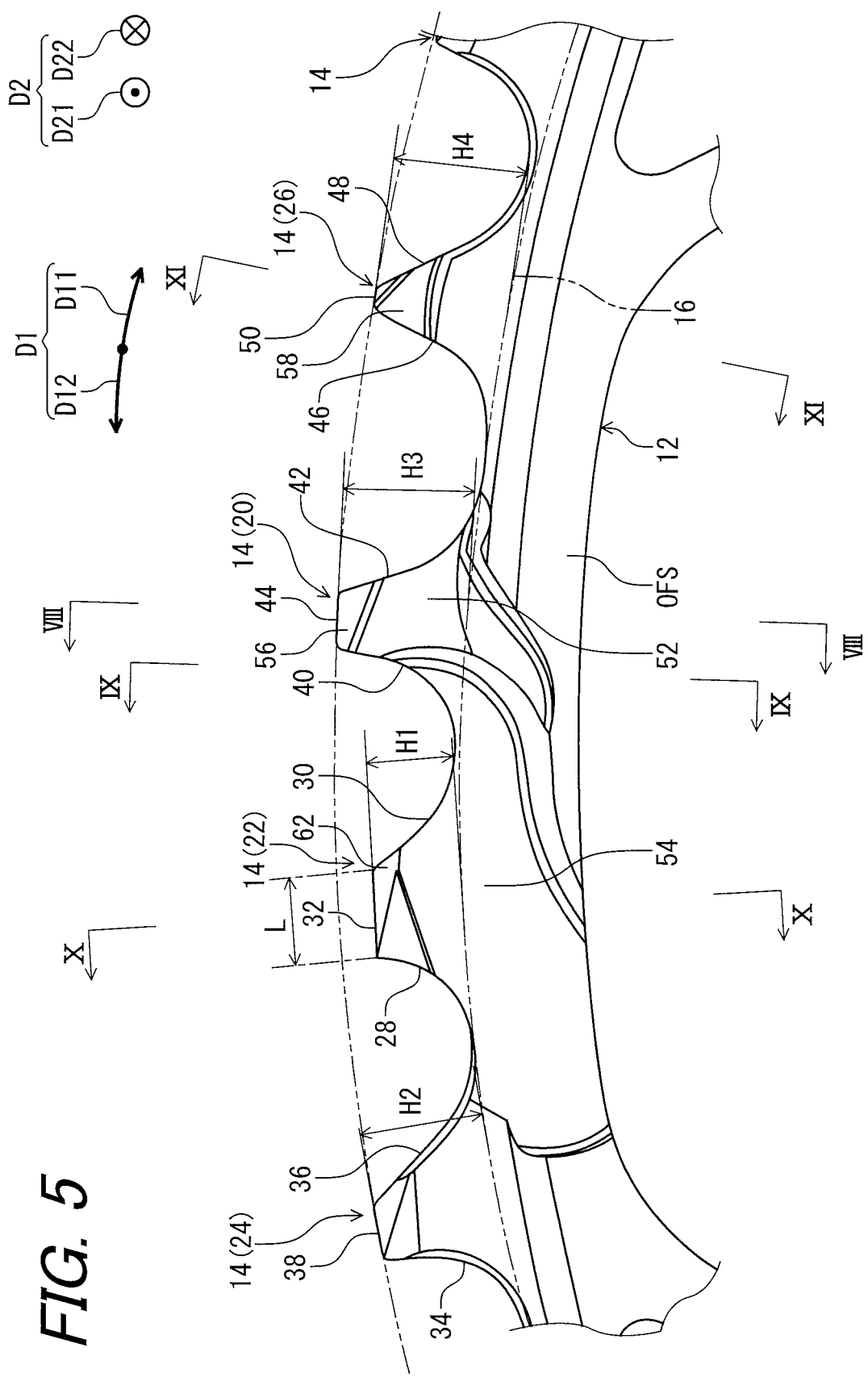
FIG. 5 is a partial side elevational view of the bicycle sprocket of the bicycle multiple sprocket assembly illustrated in FIG. 1.
Figure 6:
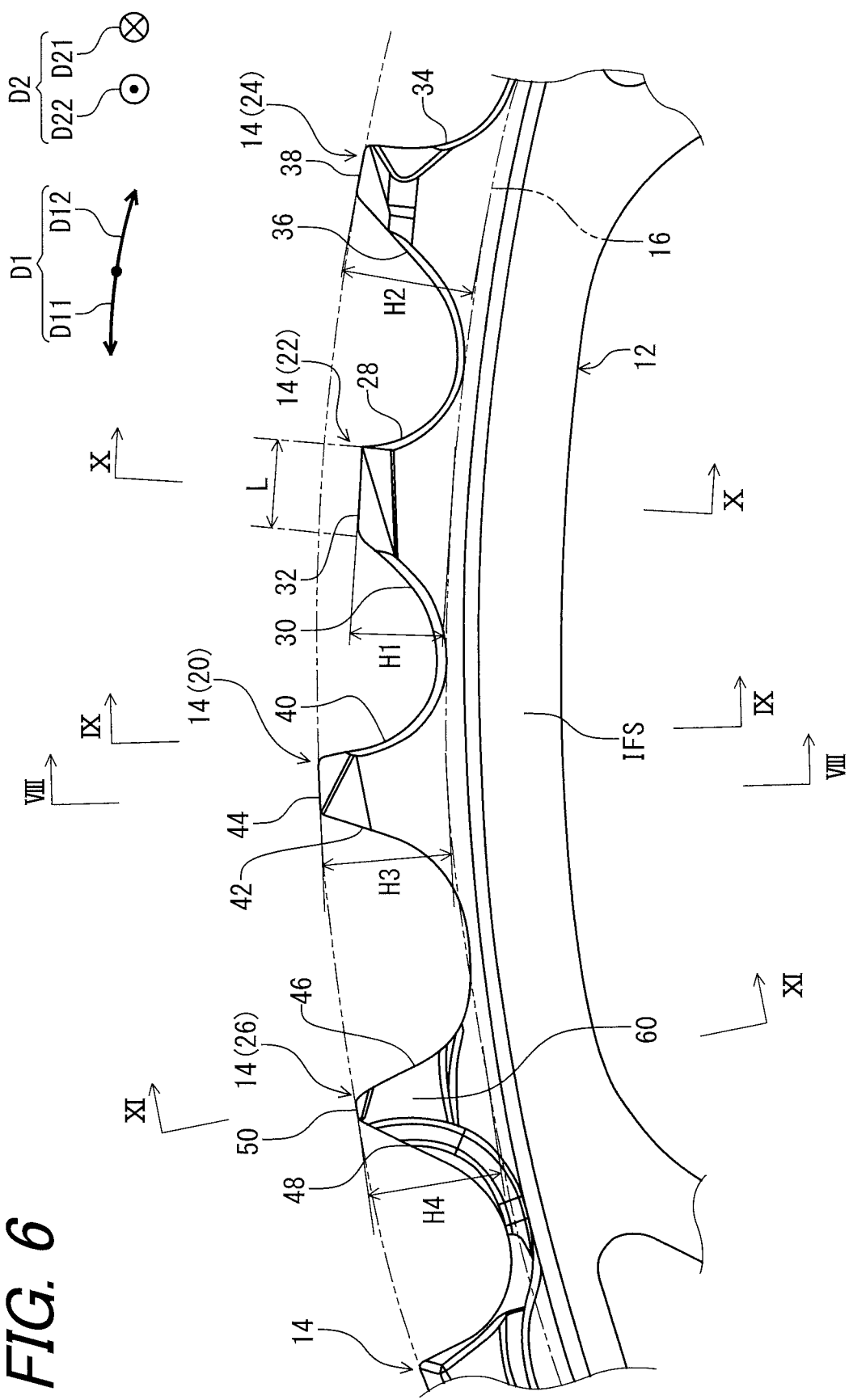
FIG. 6 is another partial side elevational view of the bicycle sprocket of the bicycle multiple sprocket assembly illustrated in FIG. 1.
Figure 7:
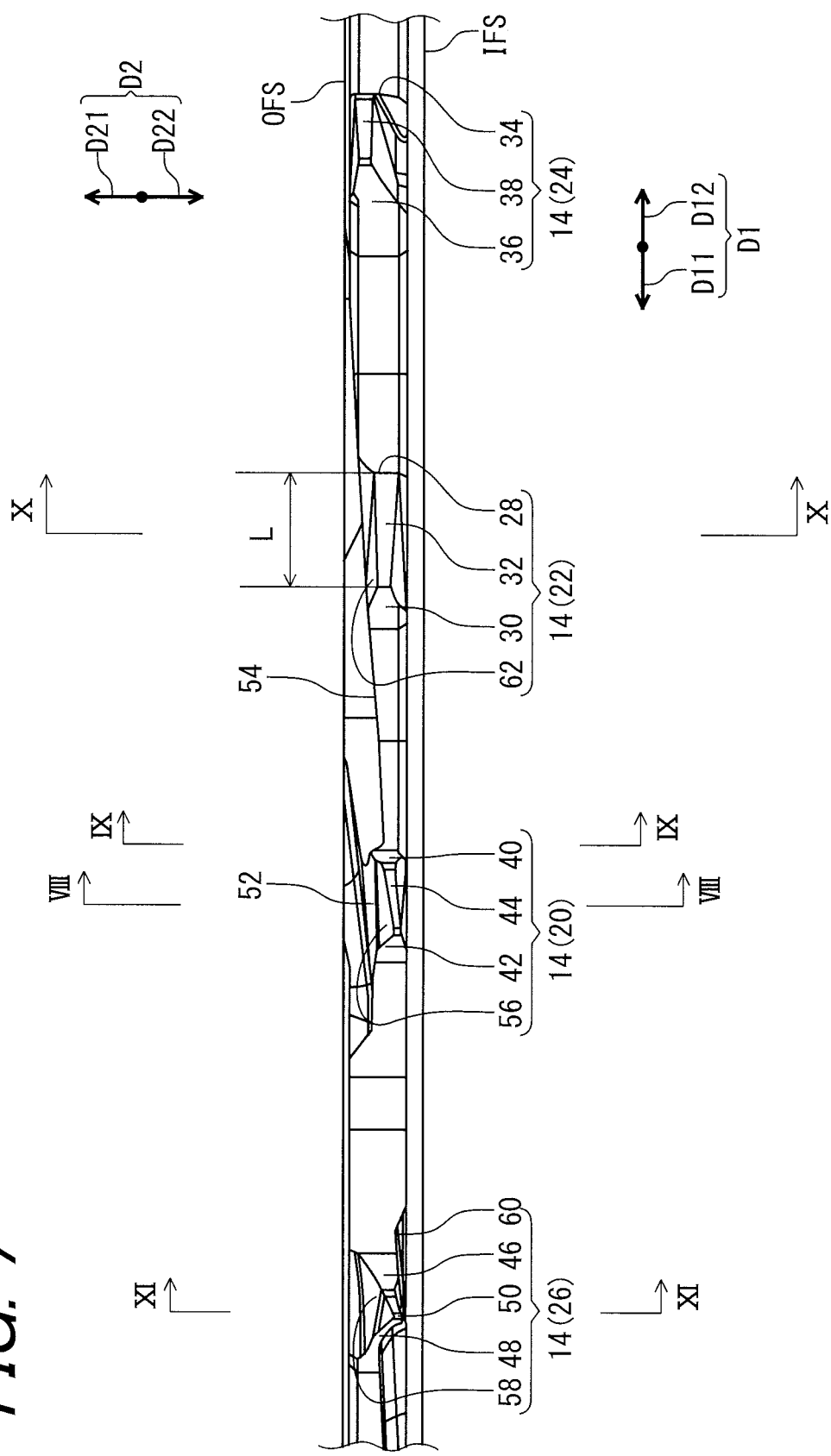
FIG. 7 is a partial plan view of the bicycle sprocket of the bicycle multiple sprocket assembly illustrated in FIG. 1.

FIGS. 5 to 7 are enlarged views illustrating the at least one first tooth 20, the at least one second tooth 22, the at least one third tooth 24, and the at least one additional tooth 26. As seen in FIGS. 5 to 7, the at least one second tooth 22 has a driving surface 28, a non-driving surface 30 opposite to the driving surface 28 in the circumferential direction D1, and a tooth tip 32 connecting the driving surface 28 and the non-driving surface 30. The driving surface 28 faces in a reversing rotational direction D12 opposite to the driving rotational direction D11. The non-driving surface 30 faces in the driving rotational direction D11. Preferably, the tooth tip 32 has a length L shorter than or equal to 1.5 mm in the circumferential direction D1. However, a range of the length L is not limited to this embodiment. The length L can be longer than 1.5 mm. In the illustrated embodiment, the tooth tip 32 is an apical surface having the length L. However, the tooth tip 32 can be an edge connecting the driving surface 28 and the non-driving surface 30. That is, the length L can be zero.

As seen in FIGS. 5 and 6, the at least one second tooth 22 has a first tooth height H1. The first tooth height H1 is a radial length between the tooth tip 32 and the root circle 16 of the bicycle sprocket 10 with respect to the rotational center axis A1.

Similarly, the at least one third tooth 24 has a driving surface 34, a non-driving surface 36 opposite to the driving surface 34 in the circumferential direction D1, and a tooth tip 38 connecting the driving surface 34 and the non-driving surface 36. The driving surface 34 faces in the reversing rotational direction D12. The non-driving surface 36 faces in the driving rotational direction D11. In the illustrated embodiment, the tooth tip 38 is an apical surface. However, the tooth tip 38 can be an edge connecting the driving surface 34 and the non-driving surface 36. The at least one third tooth 24 has a second tooth height H2. The second tooth height H2 is a radial length between the tooth tip 38 and the root circle 16 of the bicycle sprocket 10 with respect to the rotational center axis A1. In this embodiment, the second tooth height H2 is longer than the first tooth height H1. Preferably, the first tooth height H1 is shorter than the second tooth height 112 by at least 1.0 mm. More preferably, the first tooth height H1 is shorter than the second tooth height H2 by 1.1 mm to 1.6 mm. However, a difference between the first tooth height H1 and the second tooth height H2 is not limited to the above embodiment.

Further, the at least one first tooth 20 has a driving surface 40, a non-driving surface 42 opposite to the driving surface 40 in the circumferential direction D1, and a tooth tip 44 connecting the driving surface 40 and the non-driving surface 42. The driving surface 40 faces in the reversing rotational direction D12. The non-driving surface 42 faces in the driving rotational direction D11. In the illustrated embodiment, the tooth tip 44 is an apical surface. However, the tooth tip 44 can be an edge connecting the driving surface 40 and the non-driving surface 42. The at least one first tooth 20 has a third tooth height H3. The third tooth height H3 is a radial length between the tooth tip 44 and the root circle 16 of the bicycle sprocket 10 with respect to the rotational center axis A1. In this embodiment, preferably, the third tooth height H3 is longer than the first tooth height H1. In the illustrated embodiment, the third tooth height H3 is substantially equal to the second tooth height H2. However, the third tooth height H3 can be longer than the second tooth height H2.

Further, the at least one additional tooth 26 has a driving surface 46, a non-driving surface 48 opposite to the driving surface 46 in the circumferential direction D1, and a tooth tip 50 connecting the driving surface 46 and the non-driving surface 48. The driving surface 46 faces in the reversing rotational direction D12. The non-driving surface 48 faces in the driving rotational direction D11. In the illustrated embodiment, the tooth tip 50 is an apical surface. However, the tooth tip 50 can be an edge connecting the driving surface 46 and the non-driving surface 48. The at least one additional tooth 26 has a fourth tooth height H4. The fourth tooth height H4 is a radial length between the tooth tip 50 and the root circle 16 of the bicycle sprocket 10 with respect to the rotational center axis A1. In this embodiment, preferably, the fourth tooth height H4 is longer than the first tooth height H1. In the illustrated embodiment, the fourth tooth height H4 is substantially equal to the second tooth height H2. However, the fourth tooth height 114 can be longer than the second tooth height H2.

Figure 8:
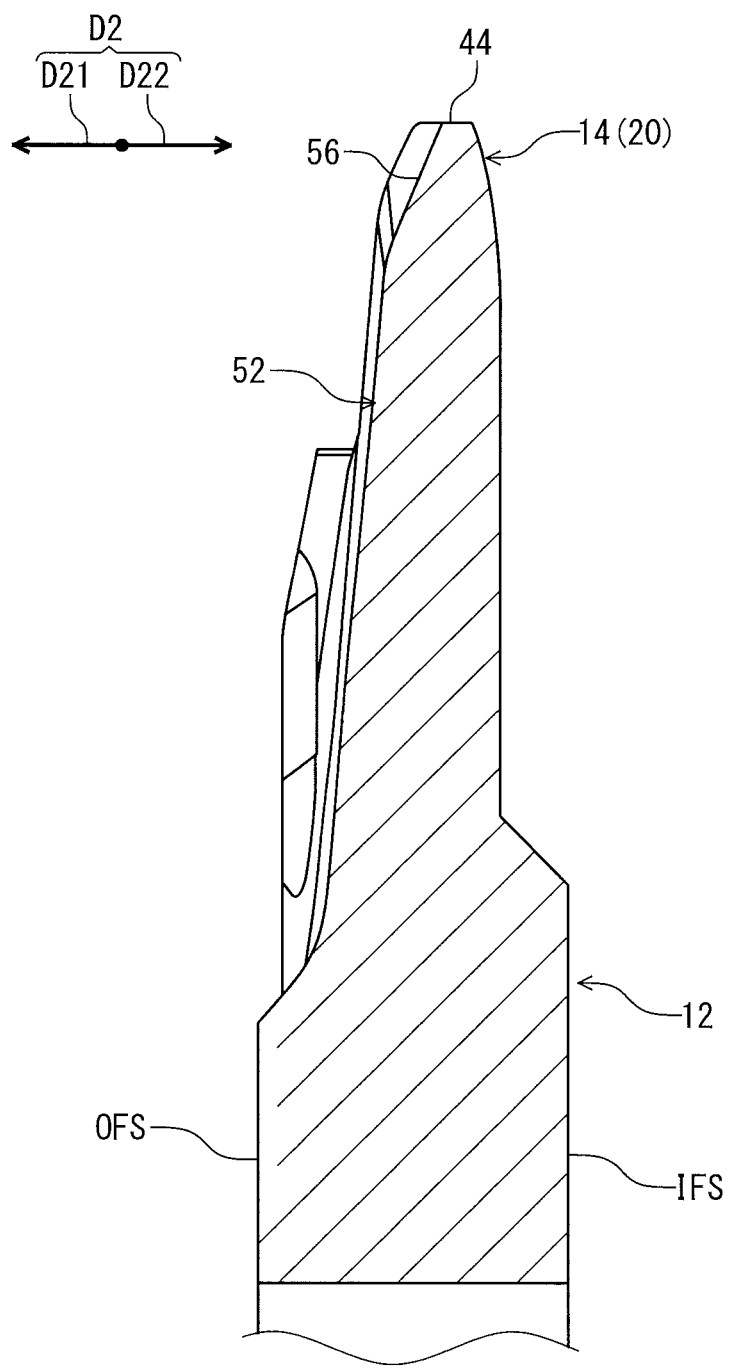
FIG. 8 is a cross-sectional view of the bicycle sprocket illustrated in FIGS. 5 to 7 as seen along section line of FIGS. 5 to 7.
Figure 9:
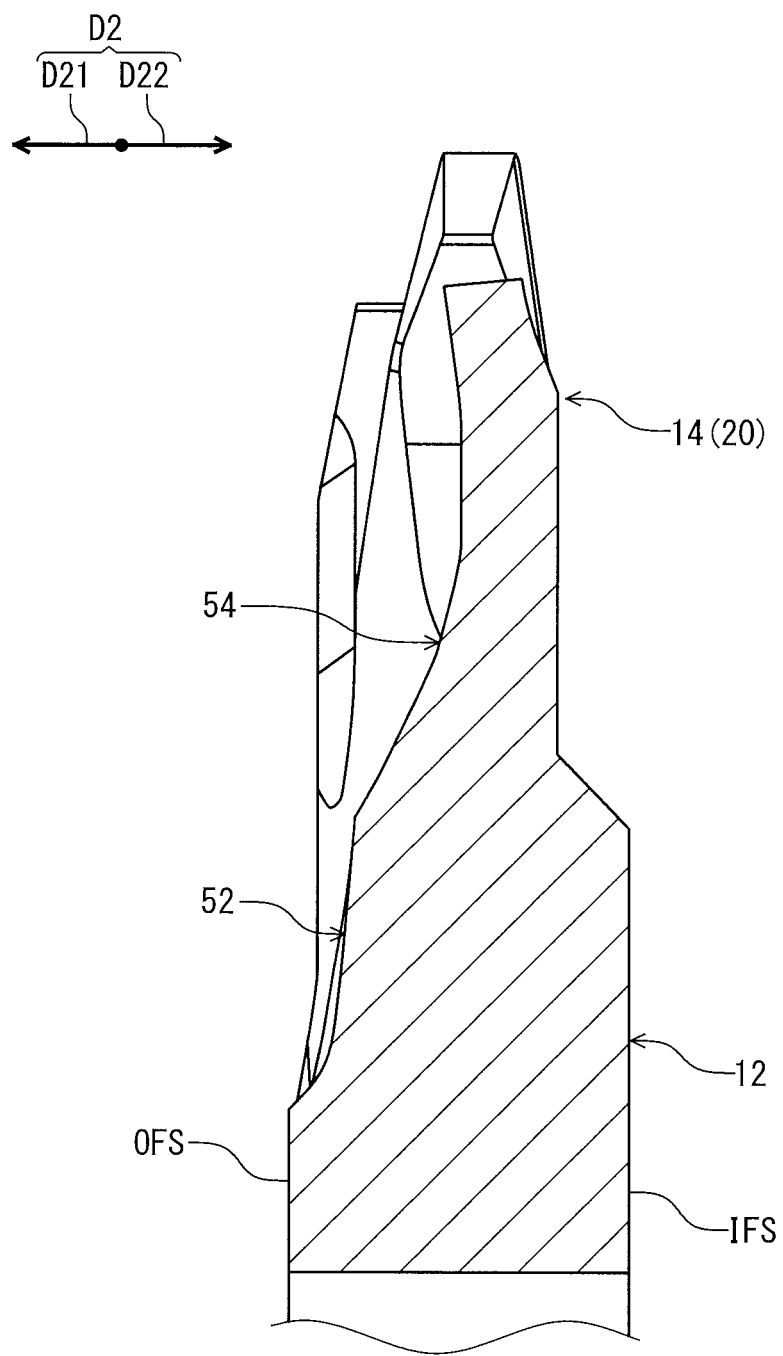
FIG. 9 is a cross-sectional view of the bicycle sprocket illustrated in FIGS. 5 to 7 as seen along section line IX-IX of FIGS. 5 to 7.
Figure 10:
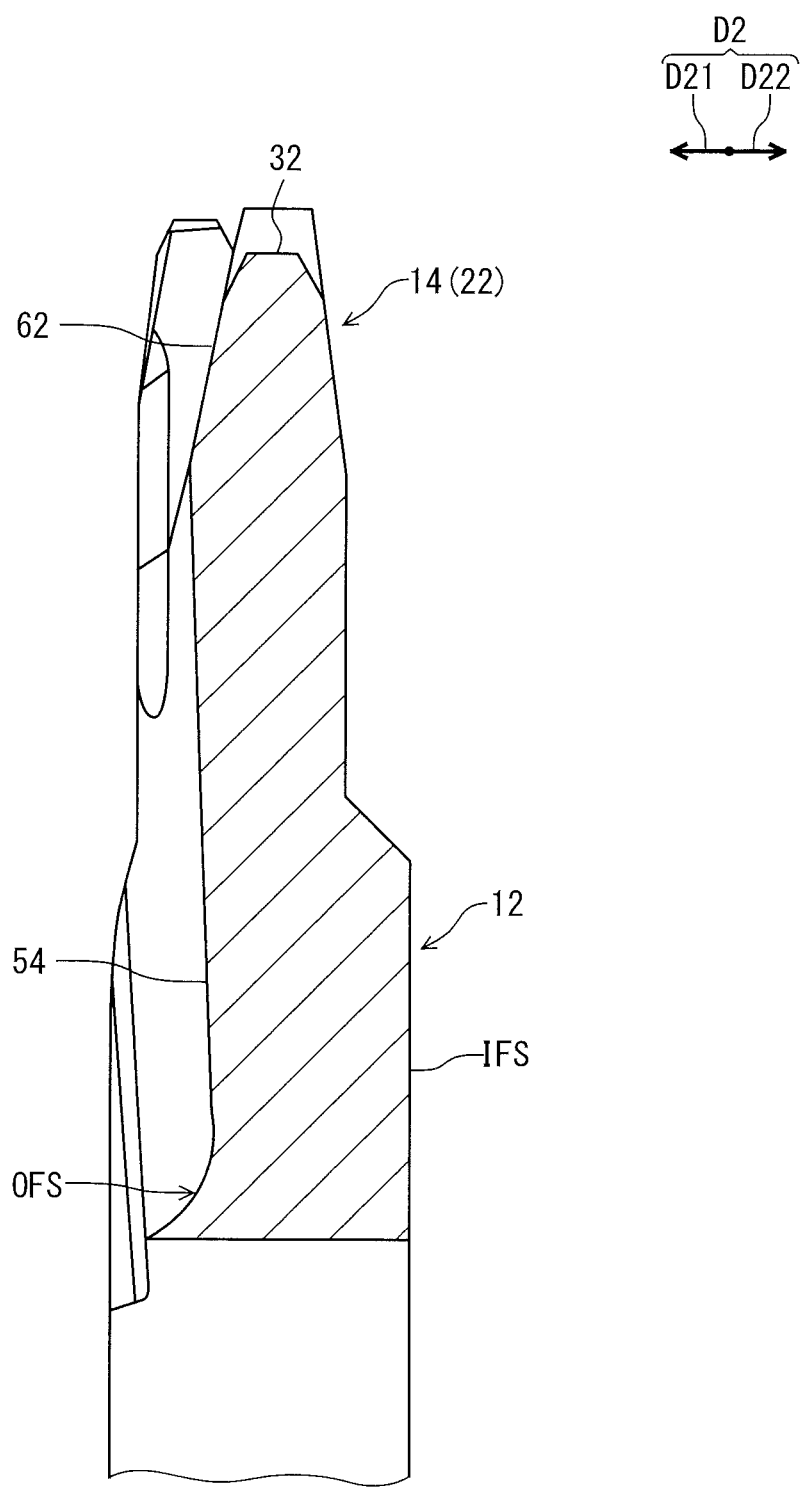
FIG. 10 is a cross-sectional view of the bicycle sprocket illustrated in FIGS. 5 to 7 as seen along section line X-X of FIGS. 5 to 7.

As seen in FIGS. 5, 7, and 8, the at least one first tooth 20 includes a first axially outward recess 52 provided on the outward facing side OFS facing in the axial direction D2 to facilitate the outward shifting operation. As seen in FIGS. 5, 7, and 9, the at least one first tooth 20 includes a second axially outward recess 54 provided on the outward facing side OFS facing in the axial direction D2 to facilitate the outward shifting operation. The second axially outward recess 54 is provided on the first axially outward recess 52 at an upstream side of the first axially outward recess 52 in the driving rotational direction D11. As seen in FIGS. 5, 7, and 10, the second axially outward recess 54 extends from the at least one first tooth 20 to the at least one second tooth 22 and the sprocket body 12. Further, as seen in FIGS. 5, 7, and 8, the at least one first tooth 20 includes a first outward chamfer 56 provided close to the tooth tip 44 of the at least one first tooth 20 on the outward facing side OFS to facilitate the outward shifting operation.

Figure 11:
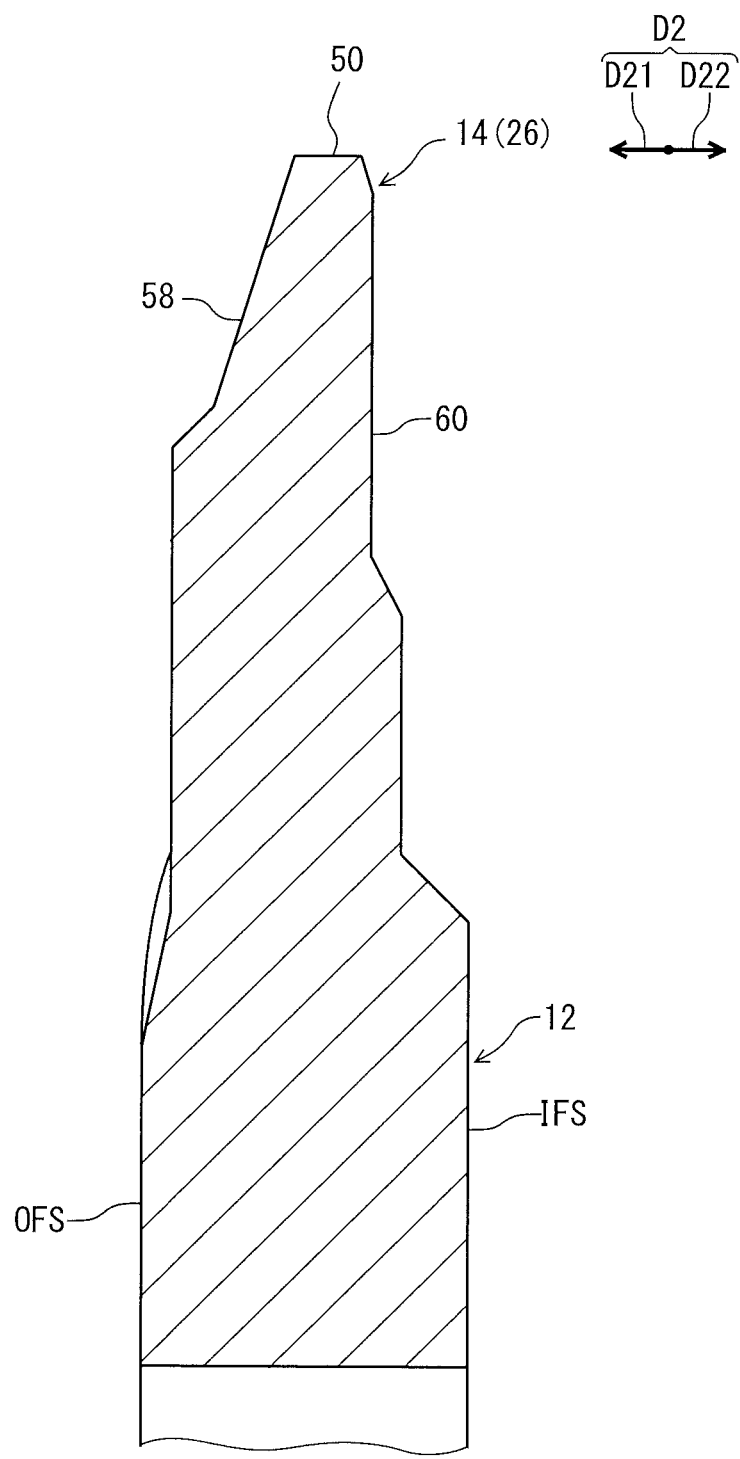
FIG. 11 is a cross-sectional view of the bicycle sprocket illustrated in FIGS. 5 to 7 as seen along section line XI-XI of FIGS. 5 to 7.

As seen in FIGS. 5, 7, and 11, the at least one additional tooth 26 includes a third axially outward recess 58 provided on the outward facing side OFS facing in the axial direction D2 to facilitate the outward shifting operation. As seen in FIGS. 6, 7, and 11, the at least one additional tooth 26 includes a first axially inward recess 60 provided on the inward facing side IFS facing in the axial direction D2 to facilitate the outward shifting operation. The third axially outward recess 58 and the first axially inward recess 60 are provided close to the tooth tip 50 of the at least one additional tooth 26. Further, as seen in FIGS. 5, 7, and 10, the at least one second tooth 22 includes a second outward chamfer 62 in addition to the second axially outward recess 54. The second outward chamfer 62 is provided on the outward facing side OFS facing in the axial direction D2 to facilitate the outward shifting operation. The second outward chamfer 62 is provided close to the tooth tip 32 of the at least one second tooth 22.

With the bicycle sprocket 10, the at least one second tooth 22 has the first tooth height H1 shorter than the second tooth height 112. Accordingly, it is possible to reduce the possibility that the at least one second tooth 22 interferes outward shifting movement of the bicycle chain C when the at least one first tooth 20 (or the at least one additional tooth 26) disengages with the bicycle chain C. Therefore, it is possible to facilitate outward shifting operation.

Second Embodiment

A bicycle sprocket 110 provided in accordance with a second embodiment will be described below referring to FIGS. 12 to 14. The bicycle sprocket 110 has substantially the same features as those of the bicycle sprocket 10 except for a shape of the at least one second tooth 22. Thus, elements having substantially the same function as those in the first embodiment will be numbered the same here, and will not be described and/or illustrated again in detail here for the sake of brevity. Further, in the second embodiment, the driving surface 40 of the at least one first tooth 20 can be referred to as an additional driving surface 40.

Figure 12:
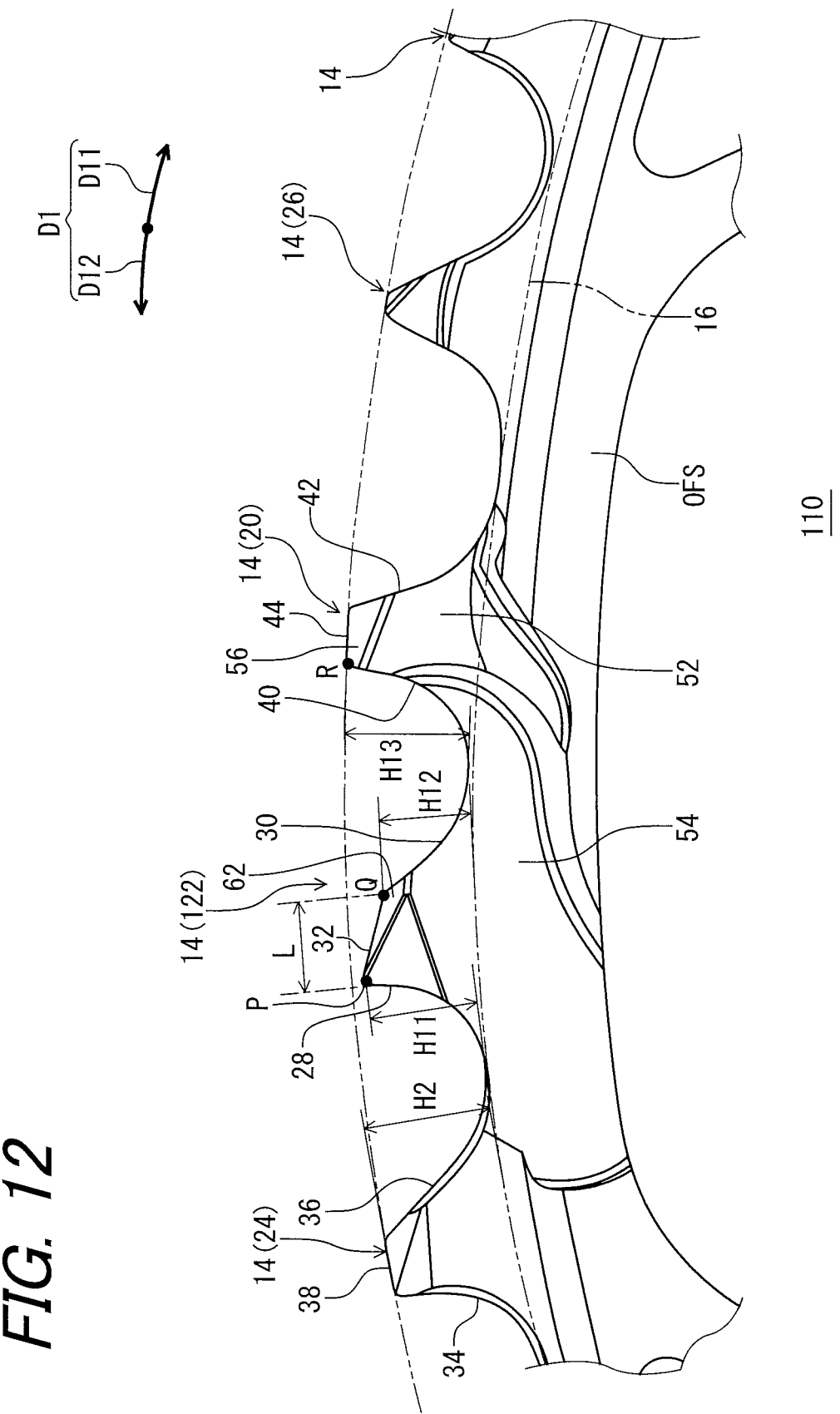
FIG. 12 is a partial side elevational view of a bicycle sprocket in accordance with a second embodiment.
Figure 13:
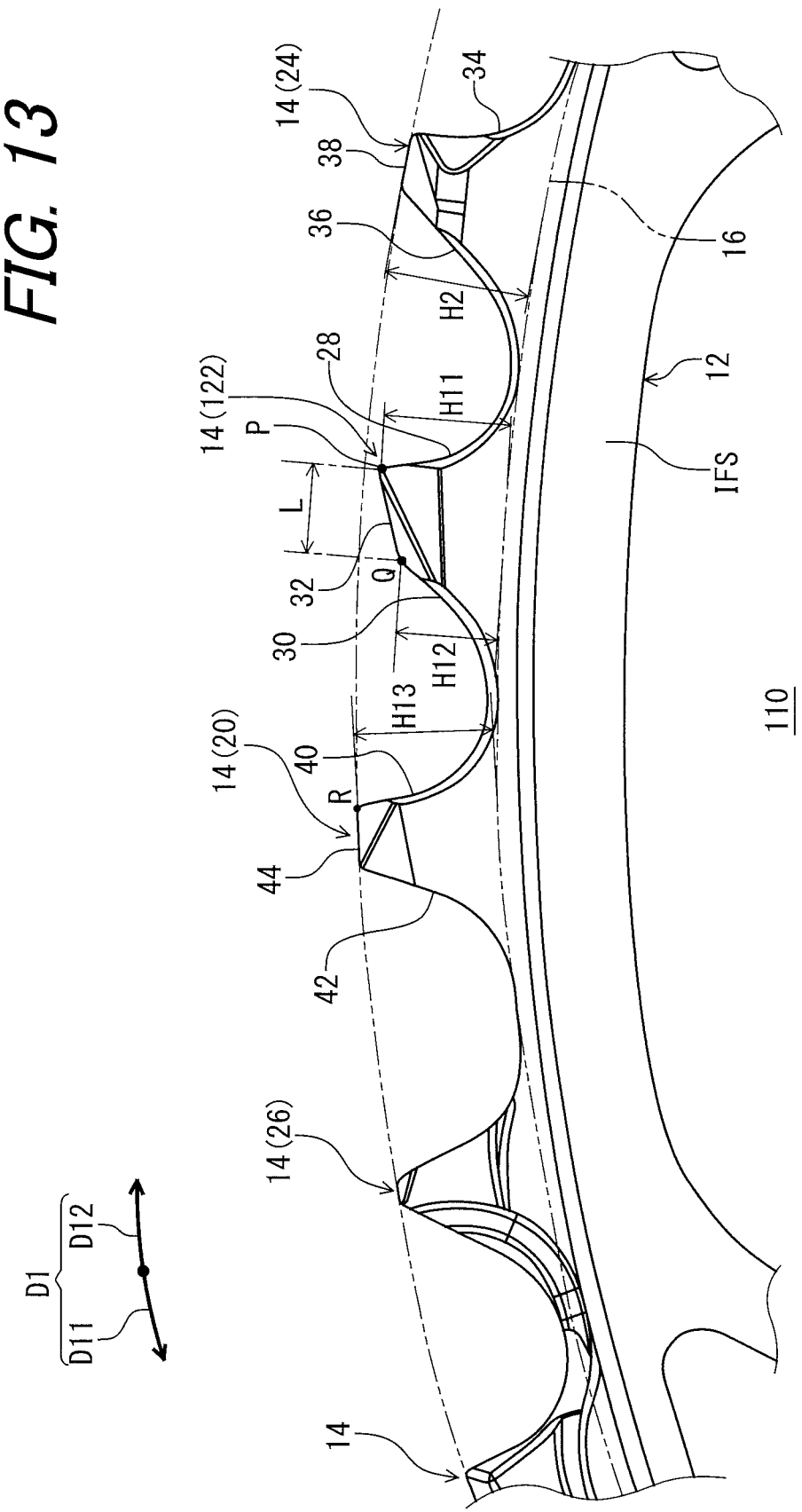
FIG. 13 is another partial side elevational view of the bicycle sprocket illustrated in FIG. 12.

As seen in FIGS. 12 to 14, the bicycle sprocket 110 comprises at least one second tooth 122. As seen in FIGS. 12 and 13, the at least one second tooth 122 has a first tooth edge height H11 at the driving surface 28 and a second tooth edge height H12 at the non-driving surface 30. The first tooth edge height H11 is a radial length between an uppermost edge P of the driving surface 28 and the root circle 16 of the bicycle sprocket 10 with respect to the rotational center axis A1. The second tooth edge height H12 is a radial length between an uppermost edge Q of the non-driving surface 30 and the root circle 16 of the bicycle sprocket 10 with respect to the rotational center axis A1. In the first embodiment, the first tooth edge height H11 is substantially equal to the second tooth edge height H12, and the first tooth edge height H11 and the second tooth edge height H12 are substantially equal to the first tooth height H1. In the second embodiment, the first tooth edge height H11 is longer than the second tooth edge height H12 by at least 0.5 mm. Although the at least one second tooth 122 has such shape, as seen in FIGS. 12 to 14, the tooth tip 32 has a length L shorter than or equal to 1.5 mm.

As seen in FIGS. 12 and 13, the at least one first tooth 20 has the additional driving surface 40 facing the non-driving surface 30 in the circumferential direction D1. The at least one first tooth 20 has a third tooth edge height H13 at the additional driving surface 40 which is longer than the first tooth edge height H11. The third tooth edge height H13 is a radial length between an uppermost edge R of the additional driving surface 40 and the root circle 16 of the bicycle sprocket 10 with respect to the rotational center axis A1. That is, the third tooth edge height H13 is substantially equal to the third tooth height H3 which is described in the first embodiment. Further, the first tooth edge height H11 is shorter than the second tooth height 112. In other words, the second tooth height 112 is longer than the first tooth height H1 in the second embodiment as same in the first embodiment. Similarly, the first tooth edge height H11 is shorter than each of the third tooth height H3 and the fourth tooth height H4 described in the first embodiment. However, at least one of the third tooth edge height H13, the second tooth height 112, the third tooth height 113, and the fourth tooth height H4 can be shorter than or substantially equal to the first tooth edge height H11. In this case, each of the third tooth edge height H13, the second tooth height H2, the third tooth height H3, and the fourth tooth height H4 is preferably longer than the second tooth edge height H12.

With the bicycle sprocket 110, the first tooth edge height H11 is longer than the second tooth edge height H12 by at least 0.5 mm. Accordingly, it is possible to provide substantially the same advantageous effect as that of the bicycle sprocket 10. That is, it is possible to reduce the possibility that the at least one second tooth 122 interferes outward shifting movement of the bicycle chain C when the at least one first tooth 20 (or the at least one additional tooth 26) disengages with the bicycle chain C. Therefore, it is possible to facilitate outward shifting operation.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket comprising:
a sprocket body; and
a plurality of sprocket teeth provided on an outer periphery of the sprocket body, the plurality of sprocket teeth including:
at least one first tooth to initially disengage with the bicycle chain in a shifting operation where the bicycle chain shifts from the bicycle sprocket to an adjacent smaller bicycle sprocket;
at least one second tooth disposed adjacent to the at least one first tooth without any tooth between the at least one first tooth and the at least one second tooth in a circumferential direction with respect to a rotational center axis of the bicycle sprocket at an upstream side of the at least one first tooth in a driving rotational direction of the bicycle sprocket, the at least one second tooth having a first tooth height; and
at least one third tooth disposed adjacent to the at least one second tooth without any tooth between the at least one second tooth and the at least one third tooth in the circumferential direction at the upstream side of the at least one second tooth, the at least one third tooth having a second tooth height longer than the first tooth height, wherein
the at least one first tooth includes a first axially outward recess provided on a side facing toward the adjacent smaller bicycle sprocket in an axial direction to facilitate the shifting operation, and
the at least one first tooth includes a second axially outward recess provided on the side facing toward the adjacent smaller bicycle sprocket in the axial direction to facilitate the shifting operation.

2. The bicycle sprocket according to claim 1, wherein the first tooth height is shorter than the second tooth height by at least 1.0 mm.

3. The bicycle sprocket according to claim 2, wherein the first tooth height is shorter than the second tooth height by 1.1 mm to 1.6 mm.

4. The bicycle sprocket according to claim 1, wherein the plurality of sprocket teeth further include at least one additional tooth to initially disengage with the bicycle chain in the shifting operation where the bicycle chain shifts from the bicycle sprocket to the adjacent smaller bicycle sprocket, and
the at least one additional tooth is disposed adjacent to the at least one first tooth without any tooth between the at least one first tooth and the at least one additional tooth in the circumferential direction at a downstream side of the at least one first tooth in the driving rotational direction.

5. The bicycle sprocket according to claim 1, wherein the at least one second tooth has a driving surface, a non-driving surface opposite to the driving surface in the circumferential direction, and a tooth tip connecting the driving surface and the non-driving surface, and
the tooth tip has a length shorter than or equal to 1.5 mm in the circumferential direction.

6. The bicycle sprocket according to claim 1, wherein the at least one first tooth has a third tooth height that is longer than the first tooth height.

7. The bicycle sprocket according to claim 1, wherein at least a portion of the first axially outward recess and at least a portion of the second axially outward recess extend radially inward of a root circle of the bicycle sprocket.

8. A bicycle sprocket comprising:
a sprocket body; and
a plurality of sprocket teeth provided on an outer periphery of the sprocket body, the plurality of sprocket teeth including:
at least one first tooth configured to initially disengage with the bicycle chain in a shifting operation where the bicycle chain shifts from the bicycle sprocket to an adjacent smaller bicycle sprocket; and at least one second tooth disposed adjacent to the at least one first tooth without any tooth between the at least one first tooth and the at least one second tooth in a circumferential direction with respect to a rotational center axis of the bicycle sprocket at an upstream side of the at least one first tooth in a driving rotational direction of the bicycle sprocket, the at least one second tooth having a driving surface and a non-driving surface opposite to the driving surface in the circumferential direction, the at least one second tooth having a first tooth edge height at the driving surface and a second tooth edge height at the non-driving surface, the first tooth edge height is longer than the second tooth edge height by at least 0.5 mm, wherein the at least one first tooth includes a first axially outward recess provided on a side facing toward the adjacent smaller bicycle sprocket in an axial direction to facilitate the shifting operation, and the at least one first tooth includes a second axially outward recess provided on the side facing toward the adjacent smaller bicycle sprocket in the axial direction to facilitate the shifting operation.

9. The bicycle sprocket according to claim 8, wherein
the at least one second tooth has a tooth tip connecting the driving surface and the non-driving surface, and
the tooth tip has a length shorter than or equal to 1.5 mm in the circumferential direction.

10. The bicycle sprocket according to claim 8, wherein
the at least one first tooth has an additional driving surface facing the non-driving surface in the circumferential direction, and
the at least one first tooth has a third tooth edge height at the additional driving surface which is longer than the first tooth edge height.

11. The bicycle sprocket according to claim 8, wherein
the plurality of sprocket teeth further include at least one additional tooth to initially disengage with the bicycle chain in the shifting operation where the bicycle chain shifts from the bicycle sprocket to the adjacent smaller bicycle sprocket, and
the at least one additional tooth is disposed adjacent to the at least one first tooth without any tooth between the at least one first tooth and the at least one additional tooth in the circumferential direction at a downstream side of the at least one first tooth in the driving rotational direction.

* * * * *